United States Patent [19]

Cutler

[11] Patent Number: 4,925,302

[45] Date of Patent: May 15, 1990

[54] FREQUENCY LOCKING DEVICE

[75] Inventor: Gregory M. Cutler, Cupertino, Calif.

[73] Assignee: Hewlett-Packard Company, Palo Alto, Calif.

[21] Appl. No.: 181,129

[22] Filed: Apr. 13, 1988

[51] Int. Cl.[5] .................... G01N 21/41; H03L 7/00
[52] U.S. Cl. ........................................ 356/128; 331/9
[58] Field of Search ............................ 356/128; 331/9

[56] References Cited

U.S. PATENT DOCUMENTS

| | | | |
|---|---|---|---|
| 3,552,860 | 1/1971 | Granqvist | 356/128 |
| 4,631,498 | 12/1986 | Cutler | 331/9 |
| 4,746,878 | 5/1988 | Cutler | 356/9 |

Primary Examiner—Richard A. Rosenberger

[57] ABSTRACT

An improved frequency locking circuit suitable for indirectly locking an optical frequency $f_0$ to a radio frequency $f_1$ or of locking the radio frequency to the optical frequency. A beam of optical frequency $f_0$ is modulated by a compound signal which is the sum of a signal at frequency $f_2$ and an FM subcarrier at frequency $f_1$ that is phase modulated at frequency $f_3$ to produce a phase modulated beam. The phase modulated beam is filtered by a filter having a transfer function having a characteristic frequency $f_f$. A pair of control signals are generated that are proportional respectively to the amplitudes of two components of the filtered signal at frequencies $f_2$, $f_3$. These control signals are separately used in a pair of servo loops to separately establish fixed values of $f_0/f_f$ and $f_1/f_f$. By using an optical cavity of the filter, the frequency locking circuit may be used for measuring the refractive index of a gas. The circuit may also be used for calibrating a multi-mode filter.

19 Claims, 6 Drawing Sheets

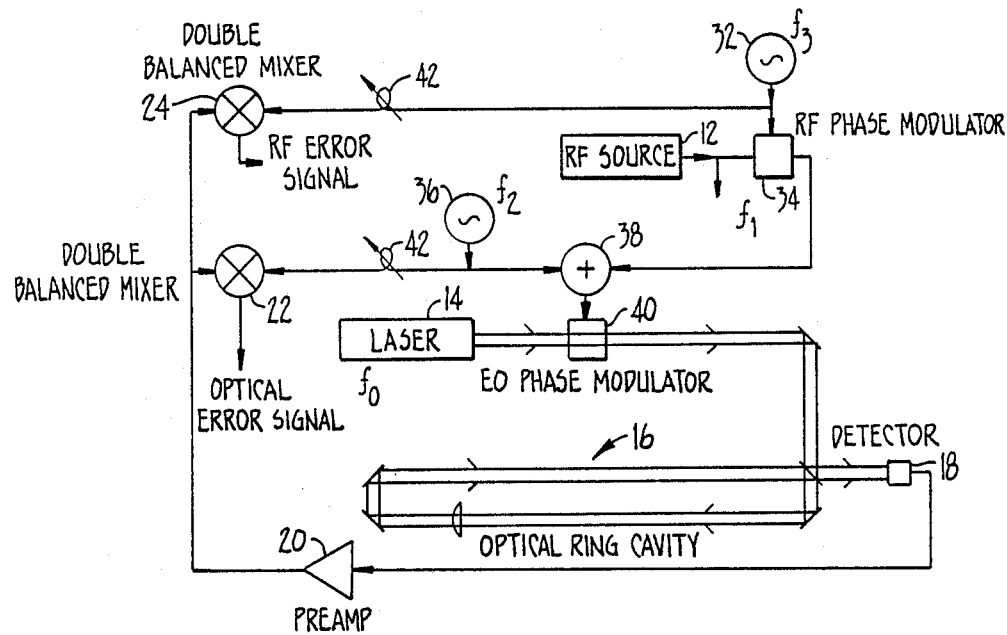
FIG._1.
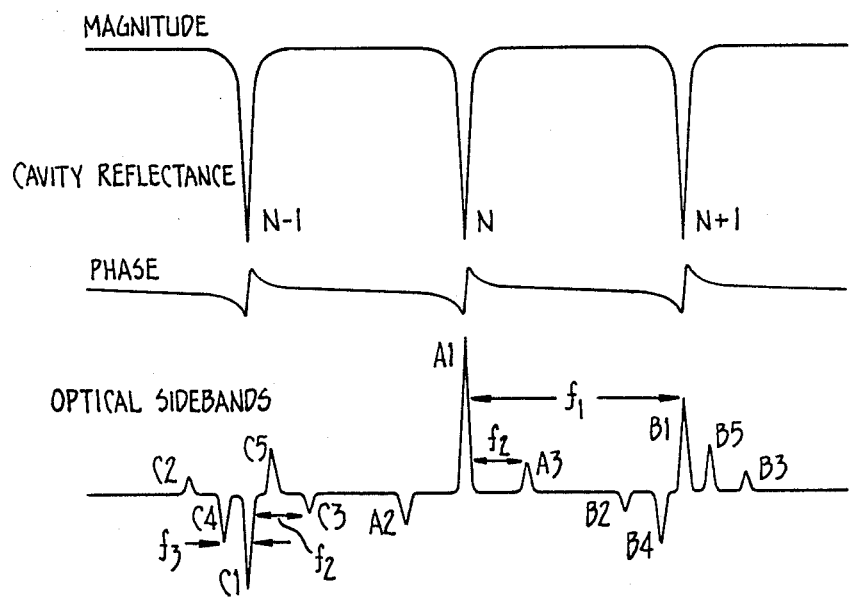
FIG._2.

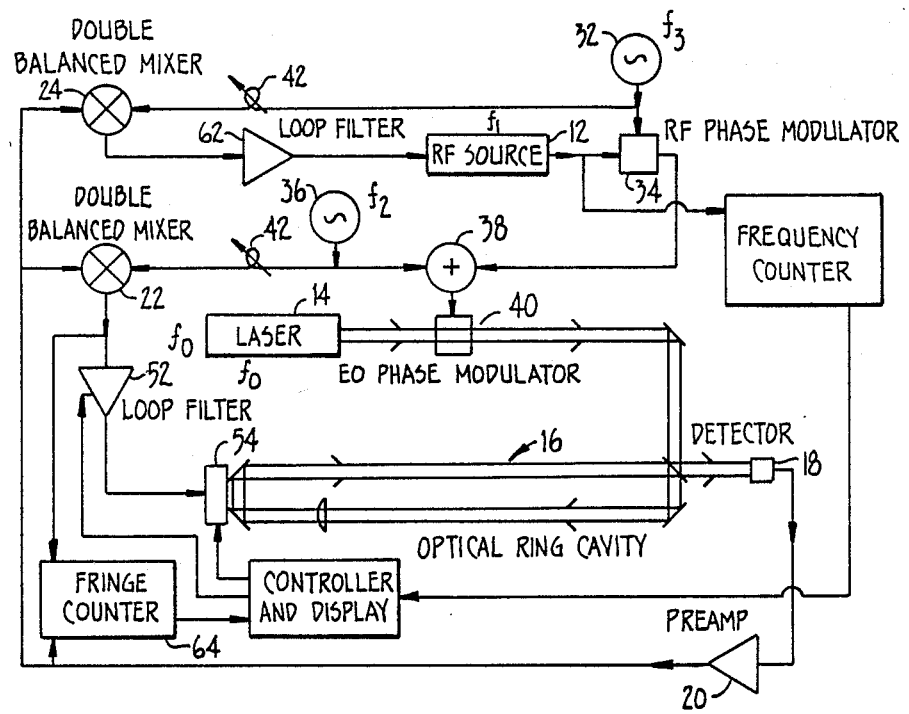
FIG._3.
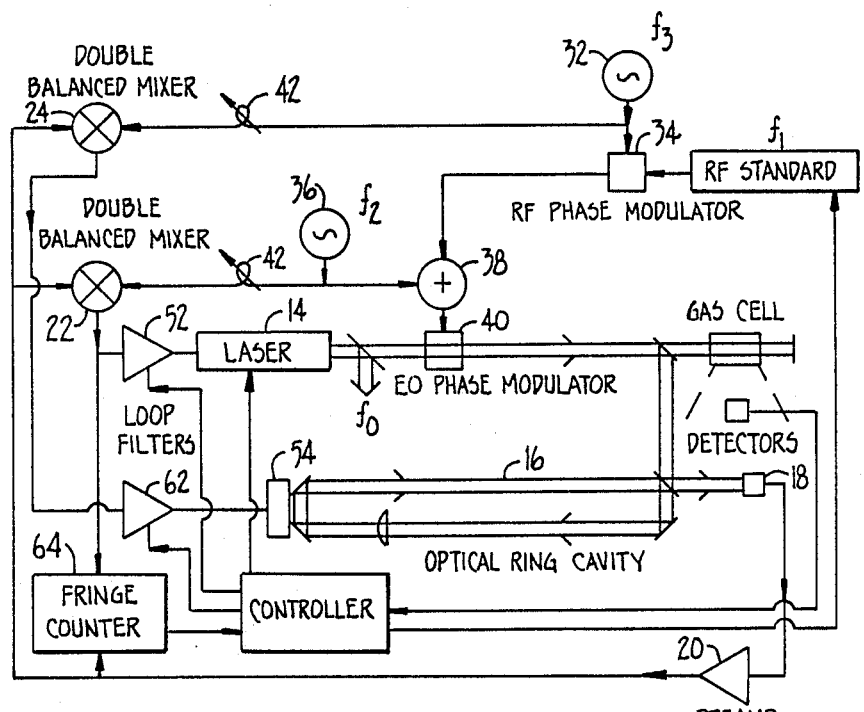
FIG._4.

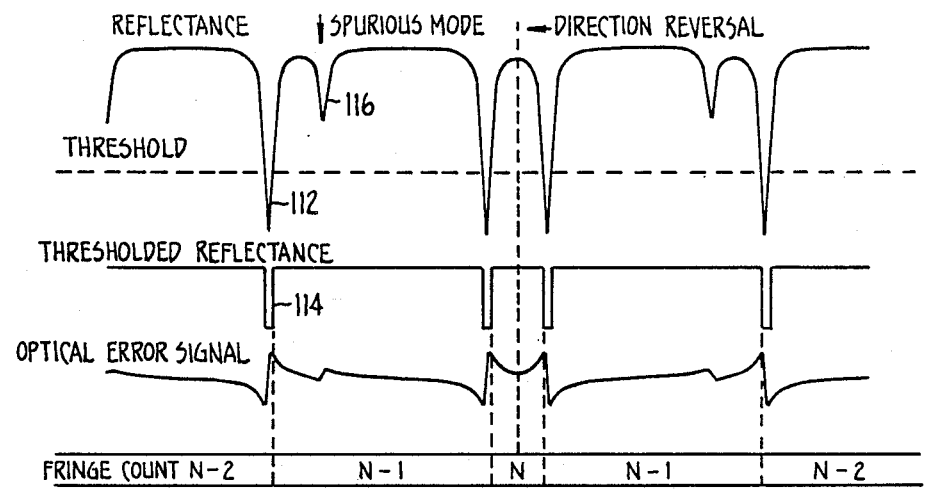
FIG._5.

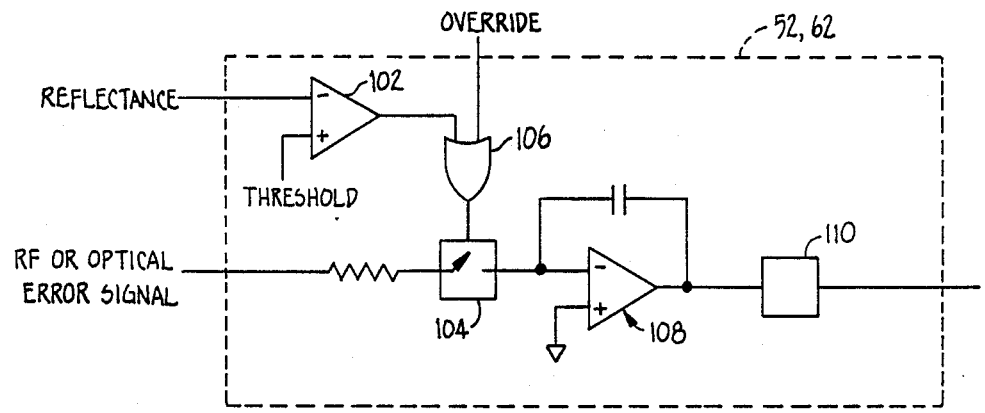
FIG._6A.
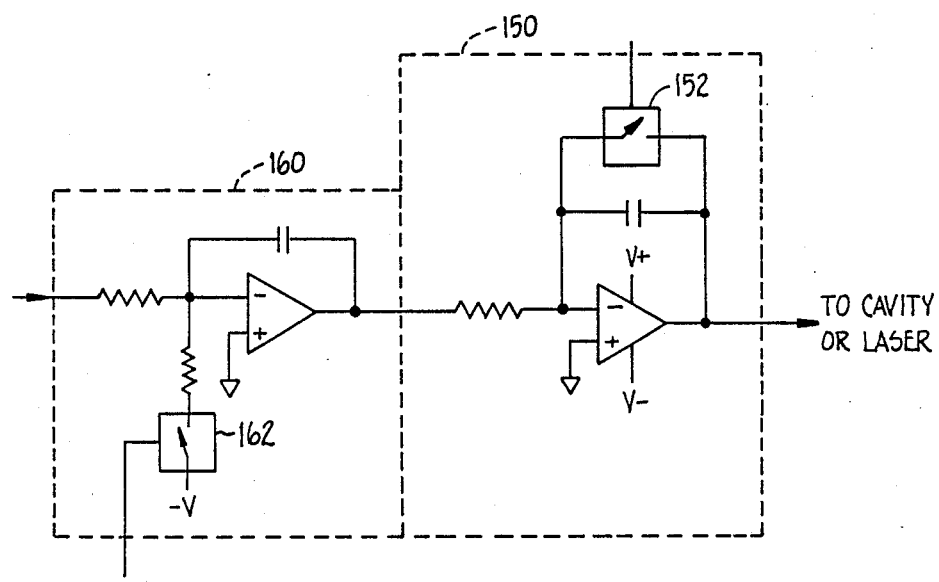
FIG._6B.

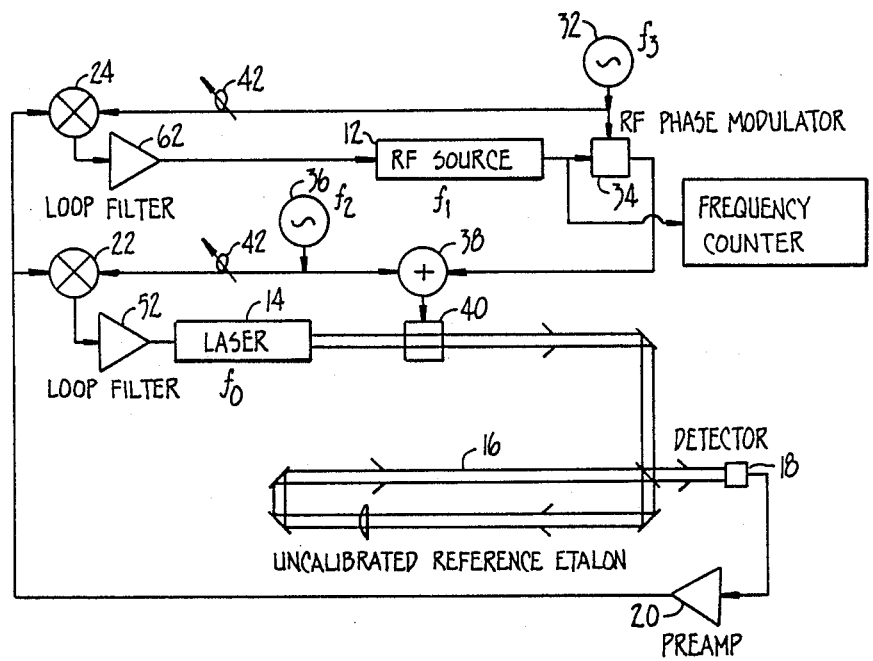
FIG._7.
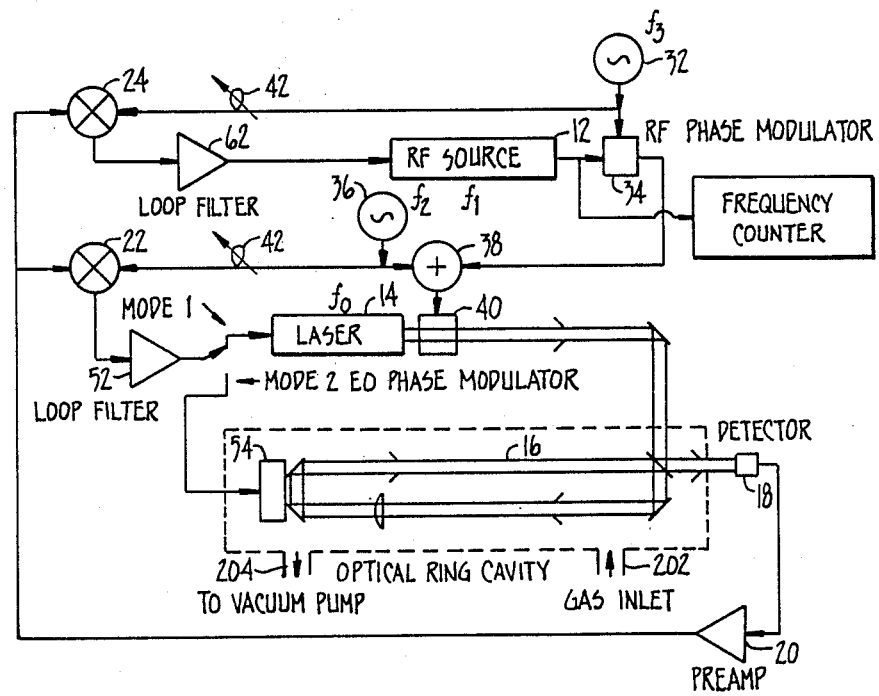
FIG._8.

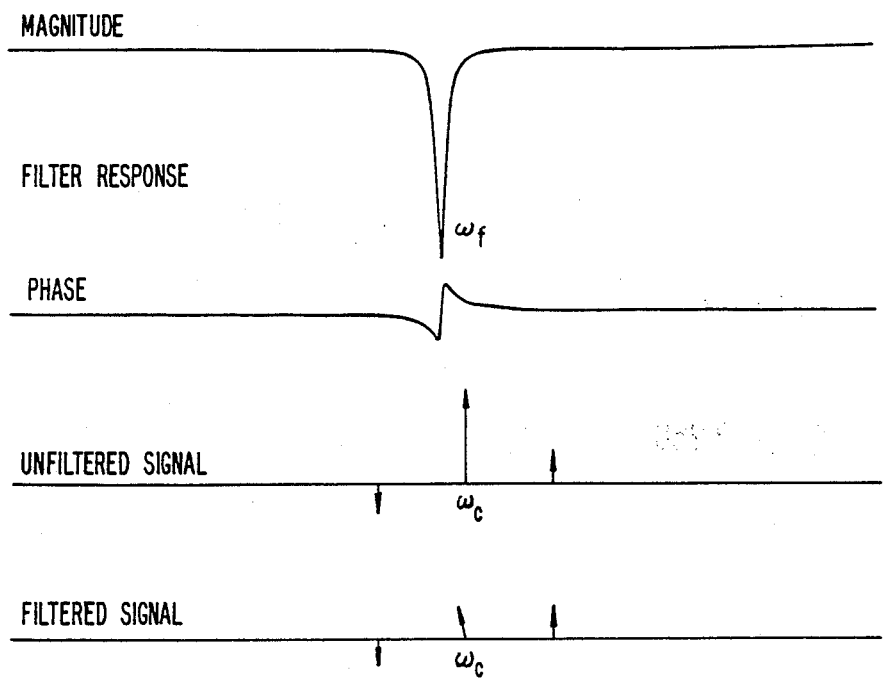
FIG._9.
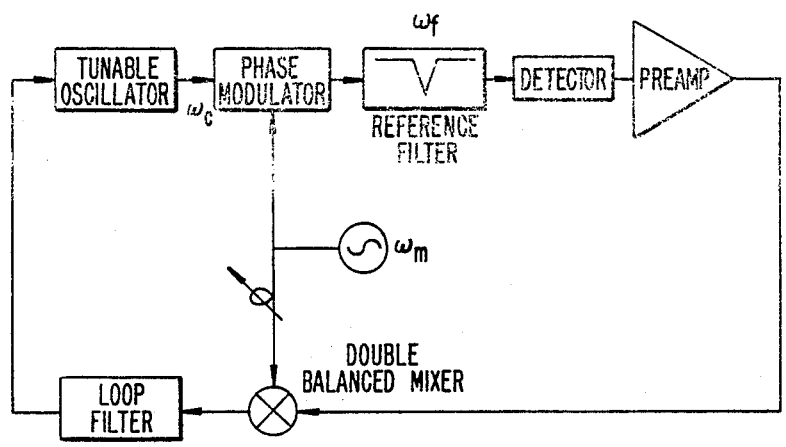
FIG._10.

FREQUENCY LOCKING DEVICE

BACKGROUND OF THE INVENTION

This invention relates in general to devices for comparing an optical frequency to a radio frequency and more particularly to an improved device for establishing a rational ratio N/M to be established between an optical frequency and a radio frequency (RF).

In U.S. Pat. No. 4,631,498 to applicant, a wave meter/frequency locking technique is disclosed which is suitable for indirectly locking an optical frequency f to a radio frequency f' or for locking the radio frequency to the optical frequency. The indirect locking is accomplished by using a filter which has a characteristic frequency $f_f$. A beam of optical frequency f is phase modulated by a subcarrier signal of average frequency f' that is itself modulated at frequency f''. The modulated beam is passed through the filter to a detector to produce a detector output signal that has frequencies at linear integral sums of f' and f''. A pair of control signals are generated that are proportional to the amplitude of the two components of the detector output signal. These control signals are used separately in a pair of servo loops to separately establish fixed values of $f/f_f$ and $f'/f_f$. The value of $f/f_f$ is stepped to a different value.

By measuring f'/f'' at each of these values of $f/f_f$, the value of f can be determined.

In the frequency locking technique described in U.S. Pat. No. 4,631,498, the filter used is an optical cavity. The control signals in the servo loops establish the two frequency ratios. This is performed by locking through an optical servo loop the optical frequency f to a maximum of the resonant mode structure of the optical cavity reflectance and locking through a RF servo loop the first-order sidebands to the minima of the resonant mode structure, where the minima may or may not be adjacent to the maximum. In other words, the control signals in the servo action set the subcarrier frequency f' equal to an odd half integral multiple of the optical cavity's free spectral range. Since the subcarrier frequency f' is used as the reference in deriving the control signals, the detector amplifier and mixers used to derive the control signals must be capable of operating at frequencies of the order of the subcarrier frequency. Since the subcarrier frequency or the RF frequency is of the order of hundreds or even thousands of megahertz, the detector amplifier and mixers used in the circuit must be capable of operating at such high frequencies which is undesirable. For this and other reasons elaborated below the frequency locking technique of U.S. Pat. No. 4,631,498 is not entirely satisfactory. It is therefore desirable to provide an improved frequency locking technique where such undesirable features are alleviated.

SUMMARY OF THE INVENTION

One aspect of the invention is directed towards a frequency locking circuit comprising a source of a beam of continuous wave, coherent radiation of frequency $f_o$ and means for phase modulating the beam in response to a compound signal which is the sum of a signal at frequency $f_2$ and a FM subcarrier at frequency $f_1$ that is phase modulated at frequency $f_3$ to produce a phase modulated beam. The circuit further comprises a filter through which the phase modulated beam passes. The filter has a transfer function that has a characteristic frequency $f_f$ and a detector responsive to the filtered beam to produce a detector signal. The circuit also comprises first means responsive to the component of the detector signal substantially at frequency $(Jf_1+Kf_2+Lf_3)$, where $(J+K)$ is an odd integer and L an even integer, for adjusting the ratio of $f_o/f_f$ to a fixed value N and second means responsive to the component detector signal substantially at frequency $(Qf_1+Rf_2+Sf_3)$, where $(Q+R)$ is an even integer and S and odd integer, for adjusting the ratio of $f_1/f_f$ to a fixed value M.

Where the filter used is an optical cavity, the frequency locking circuit or device may be adapted for measuring the refractive index of a gas. The first and second adjusting means are used to adjust the frequency ratios to fixed values N, M. The frequency locking device further comprises means for letting the gas into the optical cavity to change the transfer function as a function of the refractive index of the gas and means for measuring the subcarrier frequency before and after gas is let into the optical cavity to determine the refractive index of the gas.

The frequency locking circuit may also be used for calibrating a multimode filter whose transfer function has characteristic frequencies $Nf_f$ and $(N\pm M) f_f$. The first and second adjusting means establish the two frequency ratios, thereby determining the mode spacing of the filter.

BRIEF DESCRIPTION OF THE DRAWING

FIG. 1 is a diagram of a frequency system showing a phase modulation scheme, optics and electronics for generating the optical and RF error signals to illustrate the preferred embodiment of the invention.

FIG. 2 is a graphical illustration of the optical sideband groups compared to the resonant modes of the optical cavity generated by the phase modulation scheme of FIG. 1.

FIG. 3 is an optical frequency meter utilizing the optical error signal of FIG. 1 in an optical servo loop to lock the optical ring cavity to the laser, and an RF servo loop to lock a RF source to the optical cavity free spectral range to determine the optical frequency from RF frequency measurements.

FIG. 4 is an optical frequency synthesizer using an optical servo loop to lock the laser to the optical ring cavity, and an RF servo loop to lock the optical cavity free spectral range to the RF standard in order to synthesize optical frequency from RF frequency.

FIG. 5 is a graphical illustration of the reflectance in the optical cavity and optical error signal as a function of time while the cavity size is changed to illustrate how the effects of spurious modes on the frequency locking circuit can be reduced.

FIG. 6A is a block diagram of the loop filter of FIGS. 3 and 4 for reducing the effects of spurious modes on the circuit of FIGS. 3 and 4.

FIG. 6B is a schematic circuit diagram of a portion of the loop filter of FIG. 3 for setting the initial conditions of the optical servo in the optical frequency meter of FIG. 3 and improving its performance.

FIG. 7 is the diagram of a calibrater for calibrating a reference etalon.

FIG. 8 is the diagram of a gas refractometer using frequency locking techniques.

FIG. 9 is a graphical illustration of the filtered and unfiltered carrier and sidebands of a phase modulated signal shown with a transfer function of the filter to illustrate the invention.

FIG. 10 is a schematic circuit diagram of an oscillator locked to the resonant frequency of a filter to illustrate the invention.

DETAILED DESCRIPTION OF THE INVENTION

FIG. 1 is a diagram of a frequency locking circuit for generating optical and RF error signals for locking the optical frequency to the RF frequency or viceversa. It will be noted that the circuit of FIG. 1 is similar to that in U.S. Pat. No. 4,631,498 in that a phase modulated RF frequency signal originating from a RF source (12) is used to modulate a laser beam from a laser (14). As shown in FIG. 1, the phase modulated laser beam is supplied to an optical ring cavity 16. The reflectance of cavity 16 is detected by a detector 18. RF and optical error signals are then obtained from the detector output signal.

The circuit of FIG. 1, however, differs from that of U.S. Pat. No. 4,631,498 in one important respect. In the '498 patent, the laser beam is modulated by the RF signal of frequency $f_1$ modulated by a signal at frequency $f_2$. In the circuit of FIG. 1, the laser beam is modulated by a compound signal which is the linear sum of the RF signal at frequency $f_1$ modulated at frequency $f_3$ and another signal of frequency $f_2$. Thus in '498 patent, the RF and optical error signals are measured in reference to the RF frequency $f_1$ and the modulating frequency $f_3$. In contrast, in the circuit of FIG. 1, the two error signals are measured in reference to frequencies $f_2$ and $f_3$ instead. The RF frequency $f_1$ is usually hundreds or thousands of megahertz whereas $f_2$, $f_3$ may be less than 10 megahertz. This permits the detector 18, preamplifier 20 and mixers 22, 24 to operate at much lower frequencies than their counterparts in the circuit of the '498 patent. Thus by adding another component at frequency $f_2$ to the laser beam modulating signal, the invention of FIG. 1 dramatically lowers the operating frequency range for the components of the circuits. Therefore slower circuit elements may be used to construct the circuit of FIG. 1

As shown in FIG. 1, the RF signal from source 12 is modulated by a signal from source 32 at frequency $f_3$ by means of RF phase modulator 34. Source 36 supplies a signal at frequency $f_2$ which is added by adder 38 to the modulated RF signal to yield a compound signal which is used to modulate the laser beam through the EO phase modulator 40. The modulated beam is reflected off ring cavity 16 and detected by detector 18. The output of detector 18 is amplified by preamplifier 20 and mixed by double balanced mixer 22 with the $f_2$ frequency signal to derive the optical error signal. In other words, the component of detector output at frequency $f_2$ is detected to yield the optical error signal. Mixer 24 mixes the output of detector 18 with an $f_3$ frequency signal to detect the component of detector output at frequency $f_3$ to yield the RF error signal. Individually adjustable delay lines 42 are used to adjust the reference phases to each of the two double balanced mixers to maximize the respective error signals.

FIG. 2 is a graphical illustration of the optical sideband groups of the modulated laser beam at the output of modulator 40 compared to the resonant modes of the optical cavity 16. The sidebands are labelled in three groups A, B and C, where the sidebands at frequency $f_1$ are labelled A1, B1, C1 and those at frequency $f_2$ A2, A3, B2, B3, C2, C3, and those at frequency $f_3$ B4, B5, C4 and C5. Variation of the laser to cavity detuning corresponds to common motion of groups A, B and C, where all three groups move together relative to the resonant modes of the cavity while the spacings between the groups remain constant. Since the laser beam is modulated directly at frequency $f_2$, the sidebands corresponding to the $f_2$ component shows up in all the sideband groups and exhibits even symmetry. Thus it will be noted that for $f_2$ beat tones, all three positive beat tones (A3-A1, B3-B1, C3-C1) arise from satellite bands on the high side of the main bands where the negative beat tones (A1-A2, B1-B2, C1-C2) arise from satellite bands on the low side of the main bands (A1, B1, C1). Because of this even symmetry, there is constructive FM to AM conversion from groups A, B and C when there is common mode detuning of the main bands from cavity resonances. Hence, the detector output signal component at frequency $f_2$ is a measurement of common mode or laser to cavity detuning and is shown as the optical error signal in FIG. 1.

The RF error signal is derived with $f_3$ as the reference frequency. The $f_3$ beat tones have anti-symmetry. Thus, the positive $f_3$ beat tones (B5-B1, C1-C4) arise from the satellite band B5 on the high side of the main band B1 for group B, but from the satellite band C4 on the low side of the main band C1 for group C. The opposite is true for the negative beat tones (B1-B4, C5-C1). This antisymmetry causes constructive FM to AM conversion when there is differential mode detuning.

Where group A remains stationary while groups B and C move in opposite directions, the spacing between groups A, B and the spacing between groups A, C will vary relative to the free spectral range and is known as differential mode detuning. Hence the detector signal component at frequency $f_3$ is a measurement of differential mode or free spectral range to RF detuning and is called the RF error signal shown in FIG. 1.

This invention is based on the observation that the optical error signal may be used to adjust the laser frequency or the free spectral range of the cavity in order to match a selected minimum of the cavity reflectance, such as the Nth mode, with the $f_1$ frequency main band A1 in common mode detuning. Therefore, if the laser has frequency $f_o$ and the matched minimum of the cavity reflectance $Nf_f$, the ratio of $f_o/f_f$ will be equal to N. Thereafter, the RF error signal may be used in differential mode detuning to adjust the cavity free spectral range or the RF frequency in order to match the main bands in the sidebands (eg. B1, C1) with other resonant mode minima of cavity reflectance, such as the (N±1)th mode minima shown in FIG. 2. It will be understood, however, that such main bands in the sideband groups may be matched with resonant mode minima which are not adjacent to the one matched with the main band A1. In general, the main bands B1, C1 may be matched with the resonant modes (N±M) where the Nth mode is matched with the main band A1. Hence, in the general case, the ratio $f_1/f_f$ is fixed at M. Then the ratio $f_o/f_1$ is then N/M.

The circuit of FIG. 1 is advantageous over that in U.S. Pat. No. 4,631,498 in that it has lower shot noise. By tuning the main bands (A1, B1, C1) to a resonant minimum instead of a resonant maximum of the cavity reflectance, such main bands are filtered out by the cavity. Since shot noise is proportional to the intensity of the filtered light beam, the shot noise of the invention of this application will be much reduced compared to the locking circuit in the '498 patent where the main band A1 is tuned to a maximum and not a minimum in a cavity reflectance and where certain even sidebands are not filtered out by the cavity. The frequency locking scheme of FIG. 1 also reduces systematic errors and is easier to use for correcting sideband imbalance.

The above described advantages of the invention of FIG. 1 are maintained where the referenced frequencies for the optical and RF error signals are not $f_2$ and $f_3$. Thus in general, the optical error signal may be determined in reference to a frequency $(Jf_1+Kf_2+Lf_3)$ where $(J+K)$ is an odd integer and L an even integer. The RF error signal may be derived in reference to a frequency $(Qf_1+Rf_2+Sf_3)$, where $(Q+R)$ is an even integer and S an odd integer.

As also described in U.S. Pat. No. 4,631,498, the frequency locking circuit of FIG. 1 may be used to measure the frequency of the laser $f_o$ or the RF frequency $f_1$. FIG. 3 is a block diagram of an optical frequency meter used to determine the optical frequency from RF frequency measurements. As shown in FIG. 3, the optical error signal from mixer 22 is fed to a loop filter 52. The filtered optical error signal is then applied to a cavity size translator 54 for adjusting the free spectral range of the cavity in order to lock the Nth resonance mode minimum of the cavity reflectance to the main band A1 of the modulated laser beam. Then the RF error signal from mixer 24 is filtered by loop filter 62 and the filtered RF error signal is used to adjust the RF frequency $f_1$ in differential mode detuning to lock the main bands in the sideband group (e.g. B1 and C1 of FIG. 2) to the (N+M)th and (N−M)th minimum resonance mode of the cavity. The two loop filters 52, 62 must have at least one integrator each so that both error signals are driven to zero after the servo loops settle. Then the RF frequency and the laser frequency are related by the ratio $f_o/f_1=N/M$.

The ratio M of the RF frequency to the optical cavity free spectral range is known from a rough knowledge of the cavity size and RF frequency. The mode number N may be determined by measuring the RF frequency at two different cavity sizes. First $f_1$ is measured at one cavity size. The cavity size is then changed in a manner so that the cavity size is P fringes different from before the change (P can be positive or negative), where P is known by fringe counting and where $f_1'$ is equal to $Mf_o/(N+P)$. Then the RF frequency $f_1'$ is measured again. Thus by measuring P and $f_1'$ as well as $f_1$, the laser frequency $f_o$ and the mode number N as well as the new mode number (N+P) may be determined. If the RF frequency has uncertainty U and the product of U and the ratio N/P is less than 1, the uncertainty in the calculation of the new mode number (N+P) could be removed by rounding off its calculated value to the nearest integer.

FIG. 4 is a block diagram of an optical frequency synthesizer. As shown in FIG. 4, the optical error signal from mixer 22 is filtered by loop filter 52 and applied to laser 14, thereby adjusting the laser frequency to lock the laser to the Nth optical cavity mode minimum using common mode detuning described above. The RF error signal is filtered by loop filter 62 and applied to the cavity size translator 54 to servo lock an integral multiple of the optical cavity mode spacing to the RF frequency standard. When the servo action in the RF loop is altering the cavity mode spacing, the servo action in the optical loop adjusts the laser frequency accordingly to maintain the locking of the laser to the Nth mode minimum. Then again the optical frequency will be related to the RF frequency by $f_o/f_1=N/M$. Again the two loop filters 52, 62 must have at least one integrator each.

Coarse frequency adjustments can be made by locking the laser to different cavity modes corresponding to different values of N. The step size for a unit change in N is just a free spectral range $f_1/M$. Fine tuning the laser frequency $f_o$ by an amount df can be accomplished by adjusting the frequency of the RF standard $f_1$ by an amount Mdf/N. The required RF tuning range to give an optical fine tuning range equal to one coarse step size of $f_1/M$ is then $f_1/N$. As in the optical frequency meter, the ratio M is known from a rough knowledge of the optical cavity size and RF frequency. The relative changes in the mode number N that occur when the laser is forced to lock on different cavity modes can be tracked by a fringe counter 64. Thus if the fringe counter is initialized by means of a gas cell with a calibrated absorption line as is done conventionally, the desired optical frequency may be synthesized.

Spurious modes may occur in the cavity reflectance for various reasons such as weak excitation of higher order transverse modes in the cavity or by multiple modes in the laser. The optical servo will have a tendency to lock on these modes occasionally if nothing is done to prevent such spurious locking.

FIG. 5 is a graphical illustration of the cavity reflectance showing the true minimum of the reflectance as well as the spurious modes.

FIG. 6A is a schematic circuit diagram of a spurious mode reject circuit for preventing the spurious modes from adversely affecting the frequency locking circuit. The reject circuit of FIG. 6A may be conveniently included in the loop filters 52 and 62 of FIGS. 3 and 4. As can be seen from FIGS. 3, 4 and 6A, no optical or RF error signal is applied to the cavity size translator 54, laser 14 or the RF source 12 unless the cavity reflectance falls below a certain threshold. Thus, a comparator 102 compares the cavity reflectance to a threshold. If the reflectance falls below the threshold, comparator 102 turns on switch 104 through OR gate 106, thereby allowing the RF or optical error signal to be applied to the first integrator in the loop filter 108. The integrated error signal is then processed by other circuit elements shown included collectively in block 110 and then applied in the optical or RF servo loop. To disable the reject circuit, an override signal may be applied externally to OR gate 106 so that switch 104 is always turned on. The effect of the circuit of FIG. 6A is illustrated in FIG. 5. If a true reflectance minimum is detected by comparator 102, the comparator closes switch 104. This turns on the loop filter so that an optical error or RF error signal can be derived. Spurious mode 116 is still above the threshold so that switch 104 remains open; no optical or RF error signal is thereby provided in the optical or RF servo loop.

In the optical frequency meter of FIG. 3, it is important to initialize the optical servo loop to improve its performance. The optical cavity has a tuning range. If the voltage range of the integrator is set near the edge of the cavity tuning range, the servo action of the optical loop may cause the servo to move outside the range of the cavity, so that frequency locking fails to occur.

FIG. 6B is a schematic circuit diagram of the last integrator 150 and the second to last integrator 160 in the loop filter 52 to optimize the optical servo circuit. To initialize the optical servo circuit, the output of integrator 150 is clamped to a voltage corresponding approximately to a midpoint of the tuning range of the cavity. Thus initialization can be performed by closing switch 152, thereby setting the output of integrator 150 to a voltage approximately half way between the positive and negative rails. When integrator 150 is unclamped, switch 152 is opened, thereby allowing the output voltage to change by servo action. During the servo action in the optical servo loop it is desirable to maximize the initial slew rate of the servo. For this purpose it is desirable to set the output of the second to last integrator 160 to its maximum. This is accomplished by the configuration of integrator 160 as shown in FIG. 6B. Thus when the frequency meter circuit is initialized, both switches 152 and 162 are closed, clamping the outputs of the two integrators to desired values as described above. After initialization, both switches are opened to unclamp both integrator circuits, thereby assuring the maximum initial slew rate of integrator 150 from approximately the midpoint of the cavity tuning range. The optical servo will then slew away from the tuning range mid-point until the nearest cavity mode locks to the laser.

Use of a commercial cavity can give one part per billion accuracy in the frequency locking, which would be suitable for multiplying a quartz RF frequency standard up to optical frequency. Use of a large optical cavity with high finesse could give 0.001 part per billion accuracy, suitable for multiplying a Rubidium or Cesium frequency standard to the optical domain.

FIG. 7 is the diagram of a calibrator for calibrating a reference etalon or cavity which may be used to provide such accuracy. As shown in FIG. 7, the optical error signal is used to alter the laser frequency $f_o$ in order to lock the laser to a cavity mode. The RF error signal is then used to alter the RF frequency $f_1$ in order to lock the RF source to the optical cavities free spectral range. The free spectral range $f_c$ can be determined from the RF frequency $f_1$ by the relationship $f_c = f_1/M$ where M is known from the RF frequency and the approximate size of the cavity.

FIG. 8 is the diagram of the gas refractometer utilizing the frequency locking circuit of FIG. 1. The optical servo of the circuit of FIG. 8 is designed to operate in one of two modes. In the first mode, the optical servo locks the laser to the optical cavity. In the second mode, the optical servo locks the optical cavity to the laser. In both modes, the RF servo locks the RF source to an integral multiple of the optical cavity's free spectral range. The RF frequency $f_1$ is measured before gas is let into the cavity through a gas inlet 202, then a new RF frequency $f_1'$ is measured after the gas is let into the optical cavity. In the first mode of operation, the cavity size stays constant, and the laser changes frequency to track the Nth cavity mode position as gas is let into the optical cavity. The RF frequency will track the change in the mode spacing of the cavity through the servo action in the RF servo loop. In the second mode of operation, the optical frequency stays constant, and the optical servo adjusts the cavity size to keep the Nth mode locked to the laser as the gas is let into the cavity. The RF frequency again tracks the cavity mode spacing as the gas is let in. Both types of measurements provide enough information to determine the phase and group velocities, and hence the refractive index and its first derivative of the gas.

Incorporated by reference is the Applicant's Ph.D. dissertation "Optical to Radio and Radio to Optical Frequency Locking," submitted to the Department of Physics of Stanford University, dated March 1988. The contents of chapter 2, "The Compound FM Subcarrier Technique (CFS)" and chapter 7, "Suggestions For Future Work" in the dissertation are set forth below in the section entitled *Theoretical Description of the Invention*.

While the frequency locking circuit of this invention has been described utilizing an optical cavity as a filter, it will be understood that other multi-mode filters may also be used, such as a microwave cavity. The above-described apparatus and method and the details thereof are merely illustrative thereof, and various changes in the details and different implementations thereof may be within the scope of the appended claims.

THEORETICAL EXPLANATION OF THE INVENTION

Set forth below are the contents of Chapters 2 and 7 of Applicant's Ph.D. dissertation referenced above. The two chapters describe in more detail the theoretical basis of the invention in reference to the ten figures of this application. However, in the description below (as well as in the dissertation) different reference numerals are employed for labeling the ten figures of this application. Set forth immediately below is a table in which the left column lists the reference numerals employed herein below in this section consistent with the Applicant's dissertation. Listed in the righthand column in the table below are each of the ten figures of this application which correspond to those in the lefthand column.

| | |
|---|---|
| FIG. 2.1.1 | FIG. 9 |
| FIG. 2.1.2 | FIG. 10 |
| FIG. 2.2.1 | FIG. 1 |
| FIG. 2.2.2 | FIG. 2 |
| FIG. 2.3.1 | FIG. 3 |
| FIG. 2.3.2 | FIG. 5 |
| FIG. 2.4.1 | FIG. 4 |
| FIG. 7.2.1 | FIG. 7 |
| FIG. 7.2.2 | FIG. 8 |

In this section "Theoretical Explanation of the Invention," the invention is described by reference to the angular frequencies $\omega_0$, $\omega_1$, $\omega_2$, $\omega_3$; these frequencies are indicated in FIGS. 1–8 as non-angular frequencies $f_0$, $f_1$, $f_2$, $f_3$.

Review of FM Frequency Locking

This section will briefly review the concept of FM frequency locking an oscillator to a resonant feature of a filter. This concept is heavily relied upon in the compound FM subcarrier technique (CFS) which will be introduced in the next section of this chapter.

When a carrier signal at frequency $\omega_c$ is phase modulated by a modulation signal at frequency $\omega_m$, a carrier and sidebands result as shown in FIG. 2.1.1. The complex amplitudes of the sidebands can be determined by using a variation of the generating function for cylindrical Bessel functions $$e^{\pm i\phi \sin\theta} = \sum_{n=-\infty}^{\infty} J_n(\phi) e^{\pm n i\theta}. \qquad (2.1.1)$$

The negative integer order Bessel functions are defined as $J_n(\phi) = (-1)^n J_{-n}(\phi)$. The modulated signal can then be written as $$E = \tfrac{1}{2}E_0 e^{-i\omega_c t + \phi \sin(\omega_m t)} + c.c. \quad (2.1.2)$$

$$= \tfrac{1}{2}E_0 e^{-i\omega_c t} \sum_{n=-\infty}^{\infty} J_n(\phi) e^{-ni\omega_m t} + c.c.$$

If this phase modulated signal were detected by a square law detector, the detector signal d(t) would not contain any Fourier components at the fundamental or harmonics of $\omega_m$ because there is no AM at these frequencies. In other words, all of the beat tones from products of pairs of sidebands spaced by a given multiple of $\omega_m$ sum up to zero. This can be seen explicitly from equation 2.1.2 and 2.1.1 for the detector component at frequencies $K\omega_m$ (K≠0).

$$d_{k\omega m} = \tfrac{1}{2}E_0^2 e^{-ik\omega_m t} \sum_{n=-\infty}^{\infty} J_{n+k}(\phi) J_n(\phi) + c.c. = 0$$

The sum is evaluated by multiplying equation 2.1.1 by its complex conjugate and by $e^{ik\omega_m t}$ and integrating over t from $$\frac{-\pi}{\omega_m} \text{ to } \frac{\pi}{\omega_m}.$$

If this phase modulated signal is filtered by a filter with resonant frequency $\omega_f$ as shown in FIGS. 2.1.1 and 2.1.2, then the sideband structure will be modified and all of the beat tones between pairs of sidebands will no longer cancel in general. The FM will be partially converted to AM by the filter. The amount of AM depends on the transfer function of the filter and how it is tuned relative to the carrier frequency $\omega_c$ of the signal. The amount of AM in fact is used as a measure of the detuning between the carrier frequency $\omega_c$ and filter resonant frequency $\omega_f$ and is the basis of FM frequency locking. This can be seen pictorially from the filtered signal in FIG. 2.1.1. All of the sidebands are outside the bandwidth of the resonance and are unaltered. For small detunings where $|\omega_c - \omega_m|$ is small compared to the filter bandwidth, the carrier will be attenuated and its phase will be advanced by an amount proportional to the detuning. This phase advance of the carrier will retard the phase of the beat tone between the carrier and first upper sideband while advancing the beat tone between the carrier and first lower sideband. These two beat tones no longer cancel, resulting in AM at frequency $\omega_m$ proportional to the detuning $\omega_c - \omega_f$.

FIG. 2.1.2 shows a diagram for locking an oscillator to a filter resonance by using the FM to AM conversion as a measurement of the detuning. A four quadrant multiplier, circuit, called a double balanced mixer, can be used to multiply the detector signal by a reference signal at frequency $\omega_m$. The average voltage at the output of this multiplier will be a signed signal that is proportional to the amount of detector signal at frequency $\omega_m$ that is in phase with the reference signal. Therefore, with a properly phased reference signal, the average voltage at the output of this double balanced mixer will give the sign of, and be proportional to, the detuning of the oscillator from the filter resonance. An adjustable delay line, represented in the figure by a loop with an arrow, provides the properly phased reference signal for the double balanced mixer. If the modulation frequency is large compared to the bandwidth of the filter, then the proper reference phase lags the phase of the signal driving the phase modulator. The amount is equal to the phase delay of the detector preamplifier. In practice, the proper phase is found empirically by opening the servo loop and adjusting the reference phase to give maximum signal out of the double balanced mixer for a given detuning of the oscillator from the filter resonance. A loop filter containing at least one integrator filters the double balanced mixer signal and uses this filtered signal to adjust the frequency of the oscillator. The loop filter design and feedback polarity are chosen so that the servo loop is stable. This requires that the open loop transfer function around the loop does not equal 1 anywhere in the right half plane of the Laplace domain, equivalently anywhere in the upper half plane of the Fourier domain[7]. If the above conditions are satisfied, the servo loop will reach a steady state condition where, because of the integrator in the loop filter, the average output voltage of the double balanced mixer will be zero. Therefore, there will be no AM at frequency $\omega_m$ and hence, no detuning between the oscillator frequency $\omega_c$ and the filter resonant frequency $\omega_f$. The oscillator is then locked to resonant frequency of the filter.

Theory Behind the CFS Technique

The strategy behind the CFS technique is to put optical sidebands, with a known spacing, on a laser by modulation with a known RF frequency. Then an optical cavity is used to locate the laser frequency relative to the sideband spacing by placing the optical carrier and sidebands simultaneously in resonance with adjacent modes. When this is accomplished, the ratio between the optical and RF frequencies is an integer—ignoring dispersion and diffraction effects.

$$\omega_0 = N\omega_1 \quad (2.2.1)$$

The ratio N is the number of the mode in resonance with the carrier, and $\omega_0$ and $\omega_1$ are the laser and RF frequencies respectively. There are two ways that the afformentioned simultaneous resonance condition can be satisfied. The first is to adjust the laser frequency into resonance with a cavity mode, then adjust the cavity free spectral range and laser together (maintaining the laser in resonance with the cavity mode) until the cavity mode spacing is equal to the RF frequency. The second is to tune the cavity free spectral range to bring a cavity mode into resonance with the laser, then adjust the RF frequency to equal the free spectral range. The first method describes locking an optical to an RF frequency, while the second describes locking an RF to an optical frequency. Servo loop techniques are employed to control these adjustments and thus lock the frequencies. FM techniques are employed to provide the error signals that measure the laser to cavity detuning, and the free spectral range to RF detuning.

To generate the error signals, two more modulation signals at frequencies $\omega_2$, and $\omega_3$ respectively are introduced. As shown in FIG. 2.2.1, the laser is phase modulated by a compound signal which is the sum of a signal at frequency $\omega_2$, and an FM subcarrier at frequency $\omega_1$ that is phase modulated at frequency $\omega_3$. The phase modulated laser beam is then reflected off a ring cavity to a detector. A ring cavity is shown in the figure for clarity; a two mirror cavity with a circulator to separate the reflected beam from the incident beam could also be used. FIG. 2.2.2 compares the carrier and first-order sidebands produced by the phase modulation to the resonant mode structure of the optical cavity reflectance. The sidebands are labelled in three groups A, B, and C. Variation of the laser to cavity detuning corresponds to common motion of groups A, B, and C, where all three groups move together. Variation of the free spectral range to RF detuning corresponds to differential motion of groups B, and C, where group A remains stationary while groups B, and C move in opposing directions. If one concentrates on $\omega_2$ beat tones, FIG. 2.2.2 shows that all three positive beat tones (A3-A1, B3-B1, C3-C1) arise from satellite bands (A3, B3, C3) on the high side of the main bands (A1, B1, C1). The negative beat tones (A1-A2, B1-B2, C1-C2) arise from satellite bands (A2, B2, C2) on the low side of the main bands (A1, B1, C1). Because of this even symmetry, there is constructive FM to AM conversion from groups A, B, and C when there is common mode detuning of the main bands (A1, B1, C1) from cavity resonances. However, differential mode detuning produces no net FM to AM conversion because group A is not detuned, and the FM to AM conversion from groups B and C are alike but are of opposite signs and cancel. Hence, the detector signal component at frequency $\omega_2$ is a measurement of common mode or laser to cavity detuning and is called the optical error signal, as shown in FIG. 2.2.1. The $\omega_3$ beat tones have antisymmetry. The positive $\omega_3$ beat tones (B5-B1, C1-C4) arise from the satellite band B5 on the high side of the main band B1 for group B, but from the satellite band C4 on the low side of the main band C1 for group C. The opposite is true for the negative beat tones (B1-B4, C5-C1). This antisymmetry causes constructive FM to AM conversion when there is differential mode detuning. However, the FM to AM conversion from group B cancels group C for common mode detuning. Hence, the detector signal component at frequency $\omega_3$ is a measurement of differential mode or free spectral range to RF detuning and is called the RF error signal, in FIG. 2.2.1. Adjustable delay lines, represented by loops with arrows, are used to adjust the reference phases to the double balanced mixers. Each reference phase is adjusted to maximize its respective error signal. The details of servo locking by means of these two error signals are left for the next two sections of this chapter.

To estimate the size of these error signals, we make use of the identity 2.1.1 to write the electric field incident on the optical cavity as $$E_i = \tfrac{1}{2} E_0 e^{-i\omega_0 t} e^{-i(\phi_2 \sin(\omega_2 t) + \phi_1 \sin(\omega_1 t) + \phi_3 \sin(\omega_3 t))} + c.c.$$

$$= \tfrac{1}{2} E_0 e^{-i\omega_0 t} \sum_{l,m,n=-\infty}^{\infty} J_l(\phi_1) J_m(\phi_2) J_n(\phi_3) e^{-i(l\omega_1 + m\omega_2 + n\omega_3)t} + c.c.$$

The reflected electric field is $$E_r = \tfrac{1}{2} E_0 e^{-i\omega_0 t} \sum_{l,m,n=-\infty}^{\infty} J_l(\phi_1) J_m(\phi_2) J_n(\phi_3) r(\omega_0 + l\omega_1 + m\omega_2 + n\omega_3) e^{-i(l\omega_1 + m\omega_2 + n\omega_3)t} + c.c., \quad (2.2.3)$$

where $r(\omega)$ is the cavity reflectance with the following form.

$$r(\omega) = 1 - \frac{1-K}{F + 1 - F e^{i\omega/f_c}} \quad (2.2.4)$$

The intensity reflection contrast ratio, finesse, and free spectral range are $K^{-2}$, $\pi F$ and $f_c$ respectively. The signal components at DC and the frequencies $\omega_2$ and $\omega_3$ of the detector signal (which is proportional to the square of the reflected electric field) are $$I_{dc} = I_0 \sum_{l,m,n=-\infty}^{\infty} J_l^2(\phi_1) J_m^2(\phi_2) J_n^2(\phi_3) |r(\omega_0 + l\omega_1 + m\omega_2 + n\omega_3)|^2,$$

$$I_{\omega_2} = \quad (2.2.5)$$

$$I_0 \sum_{l,m,n=-\infty}^{\infty} J_l^2(\phi_1) J_m(\phi_2) J_{m+1}(\phi_2) J_n^2(\phi_3) r(\omega_0 + l\omega_1 + m\omega_2 + n\omega_3) r^*(\omega_0 + l\omega_1 + (m+1)\omega_2 + n\omega_3) e^{-i\omega_2 t} + c.c.$$

$$I_{\omega_3} = I_0 \sum_{l,m,n=-\infty}^{\infty} J_l^2(\phi_1) J_m^2(\phi_2) J_n(\phi_3) J_{n+1}(\phi_3) r(\omega_0 + l\omega_1 + m\omega_2 + n\omega_3) r^*(\omega_0 + l\omega_1 + m\omega_2 + (n+1)\omega_3) e^{-i\omega_3 t} + c.c.$$

where $I_0$ would be the photo current if the beam incident on the cavity were detected. The cavity reflectance can be approximated as $$r(\omega_0 + l\omega_1 + m\omega_2 + n\omega_3) = \quad (2.2.6)$$

$$\begin{cases} K - i(1-K)F \dfrac{\delta_0 + l\delta_1}{f_c} & \text{for } m = n = 0, \\ 1 & \text{otherwise,} \end{cases}$$

where $\delta_0$ and $\delta_1$ are the optical and RF detunings (rads/sec) respectively. This approximation is valid because only the $m=n=0$ sidebands are near resonance with the cavity modes, and $\delta_0$, and $\delta_1$ are assumed to be much smaller than the bandwidth of an optical cavity mode. From equations 2.2.5 and 2.2.6, the DC background detector current (for $\delta_0 = \delta_1 = 0$), and the optical and RF error signals (the amplitudes of the $\omega_2$, and $\omega_3$ frequency components of the detector signal respectively) are $$I_{dc} = \quad (2.2.7)$$

$$I_0 \left\{ 1 - (1 - K^2) J_0^2(\phi_2) \left( J_0^2(\phi_1) + 2 \sum_{l=1}^{\infty} J_l^2(\phi_1) J_0^2(l\phi_3) \right) \right\},$$

$$\epsilon_0 =$$

$$4 I_0 F \frac{1-K}{f_c} \delta_0 J_0(\phi_2) J_1(\phi_2) \left\{ J_0^2(\phi_1) + 2 \sum_{l=1}^{\infty} J_l^2(\phi_1) J_0^2(l\phi_3) \right\},$$

$$\epsilon_1 = 8 I_0 F \frac{1-K}{f_c} \delta_1 J_0^2(\phi_2) \sum_{l=1}^{\infty} l J_l^2(\phi_1) J_0(l\phi_3) J_1(l\phi_3).$$

We are now in a position to determine the effect of shot noise on the frequency locking stability of a servo system that utilizes these error signals. The fractional frequency error represented by $\delta_1$ can be reduced by a factor of M if the A, B, and C sideband groups are spaced to be M free spectral ranges of the optical cavity apart instead of just one as in figure 2.2.2. This will result in a reduction by a factor of M in the effect of noise on the fractional frequency stability. Equation 2.2.1 is modified accordingly.

$$\omega_0 = \frac{N}{M} \omega_1 \qquad (2.2.8)$$

The noise in the RF error signal will be the major source of frequency locking noise in the overall system. This is because the optical error, $$\frac{\delta_0}{2\pi},$$

is in optical Hertz representing a small fractional error while the RF error, $$\frac{\delta_1}{2\pi},$$

is in RF Hertz representing a much larger fractional error. Therefore the signal to noise ratio does not benefit from a large $\phi_2$. In fact, $\phi_2$ could be reduced to a factor of $(N/M)^2$ small than $\phi_1$ before the noise in the optical error signal would contribute as much as that from the RF error signal. Consequently, only a very small modulation index of about $\phi_2 = 0.005$ is necessary for the optical loop where the approximations $J_0(\phi_2) = 1$, and $J_1(\phi_2) = \phi_2/2$ hold. The double balanced mixer, which multiplies the photodiode signal by $\sin(\omega_3 t)$ to produce the RF error signal, provides a DC signal of $\frac{1}{2}\epsilon_1$ (referenced to the photodiode). The rms deviation of the time averaged product of the photo current and $\sin(\omega_3 t)$ phase reference signal is $$\sqrt{\frac{I_{dc} q_e}{2\tau}}$$

where $q_e$ is the electronic charge, and $\tau$ is the averaging time. Then from equation 2.2.7, the Allan variance[8], $\sigma^2(\tau)$, for $f_0$ (frequency synthesizer case) or $f_1$ (frequency meter case) can be determined.

$$\sigma(\tau) = \sqrt{\frac{2q_e}{I_0 \tau}} \; \frac{\sqrt{1 - (1-K^2)\left\{ J_0^2(\phi_1) + 2 \sum_{l=1}^{\infty} J_l^2(\phi_1) J_0^2(l\phi_3) \right\}}}{16 M\pi F(1-K) \sum_{l=1}^{\infty} l J_l^2(\phi_1) J_0(l\phi_3) J_1(l\phi_3)} \qquad (2.2.9)$$

This is a closed loop result, and is valid in the limit that $1/\tau$ is small compared to the closed loop bandwidth of both servos. In the limit of small $\phi_1$, this reduces to $$\sigma(\tau) = \sqrt{\frac{2q_e}{I_0 \tau}} \; \frac{\sqrt{K^2 + 2(1-K^2)J_1^2(\phi_1)\{1 - J_0^2(\phi_3)\}}}{16 M\pi F(1-K)J_1^2(\phi_1)J_0(\phi_3)J_1(\phi_3)}. \qquad (2.2.10)$$

Optical Frequency Measurement

Optical frequency measurement is accomplished by first using the optical error signal in a servo loop, called the optical loop, to lock an optical cavity mode to the laser. Then the RF error signal is used in a servo loop to lock an RF frequency to the optical cavity mode spacing, as shown in FIG. 2.3.1. The two loop filters used in these servo loops must have at least one integrator each so that both error signals are driven to zero after the servo loops settle. Then the RF frequency is related by equation 2.2.8 to the optical frequency.

$$f_1 = \frac{M}{N} f_0$$

The ratio, M, of RF frequency to optical cavity free spectral range is known from a rough knowledge of the cavity size and RF frequency. However, N is not known, and must be determined before the optical frequency can be measured in terms of the RF frequency. The mode number N may be determined by measuring the RF frequency at two different cavity sizes. First, measure $f_1$ at one cavity size, where $$f_1 = \frac{M}{N} f_0.$$

Then measure the RF frequency $f_1'$ at a cavity size that is P fringes different, where P is known by fringe counting and where $$f'_1 = \frac{M}{N+P} f_0.$$

The mode number $N' = N+P$ and optical frequency $f_0$ can then be determined.

$$N' = \frac{P}{\left|\frac{f'_1}{f_1} - 1\right|} \qquad (2.3.1)$$

$$f_0 = \frac{N'}{M} f_1$$

The RF frequency $f_1'$ will track the optical frequency $f_0$ by this ratio $M/N'$ as long as both servo loops remain in lock. Therefore, once N' has been measured, subsequent measurements of the optical frequency can be made by applying the scale factor to subsequent measurements of the RF frequency $f_1'$. Equation 2.3.1 shows that there will be a loss of accuracy in the determined value for $f_0$ due to the subtraction in the denominator for N'. The uncertainty is on the order of $$\frac{\Delta N'}{N'} = \frac{\sqrt{2}}{\left|\frac{f'_1}{f_1} - 1\right|} \frac{\Delta f_1}{f_1}, \qquad (2.3.2)$$

$$\frac{\Delta f_0}{f_0} = \sqrt{\left(\frac{\Delta N'}{N'}\right)^2 + \left(\frac{\Delta f_1}{f_1}\right)^2}.$$

The full accuracy may be recovered if $|\Delta N'| < 1$ so that N' may be truncated to its closest integer thus making $\Delta N'/N' = 0$.

There are two details involved with changing the cavity size and getting the optical servo properly locked afterwards. First, the optical servo is designed to be at least a second-order servo (two or more integrations in the loop filter). Also, the saturation level of the second to last integrator is chosen to be small enough that the maximum slew rate of the output is not high enough to prevent the optical loop from locking. This allows the optical servo to be clamped in the following manner during the cavity size change. The last integrator is clamped to its midrange output voltage and the first is clamped at its maximum output voltage. Thus when the cavity size has finished its change and the optical servo is unclamped, the servo will slew its cavity size translator from its midrange position until the nearest cavity mode locks to the laser. The second detail is a correction for a complication arising from spurious modes (these show up as small secondary spikes in the optical cavity reflectance as shown in FIG. 2.3.2) that may exist. These modes can be caused by weak excitation of higher order transverse modes in the optical cavity or by multiple modes in the laser. The optical servo will have a tendency to lock on these modes occasionally if nothing is done about them. A spurious mode reject circuit is incorporated into the optical servo to solve this problem. When enabled, this circuit holds the first integrator in the loop filter at its present value unless the optical cavity reflectance falls below a certain threshold level, thus allowing only strongly excited cavity modes to be locked to strong laser modes. The reflectance thresholding circuit used for fringe counting (in FIG. 2.3.2) is suitable for this purpose.

The fringe counting is done by a directional quadrature counter. A simple counter that just counts the pulses in the reflection signal is not suitable because during the cavity size change, the size can't be guaranteed to be a monotonic function of time. The counter would show too high a count from multiple counting of certain fringes during direction changes. These directional ambiguities show up at the turning points of the periodic waveform that is being counted. The directional quadrature counter solves this problem by using two different periodic signals to count. The signals are chosen such that turning points do not occur simultaneously in both. Hence enough information exists from one signal to remove the ambiguity from the other. The reflection signal and the optical error signal, shown in FIG. 2.3.2, satisfy these criteria and are used. The reflection signal is compared against a preset threshold. The optical error signal is compared against zero. The fringe counter is incremented on a rising transition of the reflection comparator output only when the optical error signal is greater than zero. The fringe counter is decremented on a falling transition of the reflection comparator output only when the optical error signal is greater than zero. FIG. 2.3.2 illustrates this counting algorithm. One final requirement for fringe counting is to turn off the RF power at frequency $f_1$ during the cavity size change because if $f_1$ gets too far detuned from $Mf_c$, the corresponding sidebands cause extra spikes in the reflectance curve that can cause errors in fringe counting.

In summary, the following steps are taken for mode number determination.
1. Measure RF frequency $f_1$
2. Turn off RF
3. Clamp optical servo
4. Change optical cavity size and count fringes (P=fringe count)
5. Turn on spurious mode reject
6. Unclamp optical servo
7. Wait for optical servo to settle
8. Turn off spurious mode reject
9. Turn off RF
10. Measure RF frequency $f_1'$
11. Calculate N' using equation 2.3.1

The optical frequency is then measured by:
1. Measure RF frequency $f_1'$
2. Determine optical frequency $$f_0 = \frac{N'}{M} f_1$$

3. Go to step 1

Optical Frequency Synthesis

Optical frequency synthesis can be accomplished by first using the optical error signal in a servo loop, called the optical loop, to lock the laser to an optical cavity mode. The RF error signal can then be used to servo lock the optical cavity mode spacing to a multiple of an RF frequency standard. The optical frequency will then be related to the RF frequency by $$f_0 = \frac{N}{M} f_1. \qquad (2.4.1)$$

FIG. 2.4.1 is a block diagram of such an instrument. As in the case of optical frequency measurement, the two loop filters used in these servo loops must have at least one integrator each so that both error signals are driven to zero after the servo loops settle. The optical servo contains at least two integrators and can be clamped. When clamped, the output of the final integrator is clamped to a level set by the controller, and the second to last integrator is clamped to its maximum level. This allows the controller to clamp the optical servo and sweep the laser open loop by adjusting the clamp level, then unclamp it and have the optical servo slew to and lock the laser frequency to the closest optical cavity mode. The optical servo also requires a spurious mode reject circuit, as decribed in section three of this chapter, to acquire proper lock when unclamped.

Coarse frequency adjustments can be made by locking the laser to different cavity modes corresponding to different values of N in equation 2.4.1. The step size for a unit change in N is just the free spectral range $f_1/M$. Fine tuning the laser frequency $f_0$ by an amount $\Delta f$ can be accomplished by adjusting the frequency of the RF standard $f_1$ by an amount $$\frac{M}{N} \Delta f.$$

The required RF tuning range to give an optical fine tuning range equal to one course step size of $f_1/M$ is then $f_1/N$. Hence, for an optical mode number $N \approx 10^6$ and RF frequency of $f_1 \approx 2$GHz, the required tuning range would be $\approx 2$KHz. A desired optical frequency can be selected by setting N and $f_1$ to $$N = \text{int}\left(\frac{Mf_0}{f_b}\right), \quad (2.4.2)$$

$$f_1 = \frac{M}{N}f_0,$$

where $f_b$ is the bottom of the tuning range for the RF standard, and the function int is the integer part of its argument.

The ratio, M, of RF frequency to optical cavity free spectral range is known from a rough knowledge of the optical cavity size and RF frequency, like the optical frequency meter. However, N is not known, and must be determined. Relative changes in the mode number N, that occur when the laser is forced to lock on different cavity modes, can be tracked by a fringe counter. But initially the fringe counter must be set to the proper value. This is what the gas cell shown in FIG. 2.4.1 provides. The gas in the cell would have a calibrated absorption line at frequency $f_g$ with a Doppler broadened width of $\approx$1GHz. The detector would pick up luminescence from the gas cell when the laser is tuned to this line. The 1GHz width of the line would cover a few coarse tuning steps of the synthesizer. The fringe counter could be initialized by the following algorithm.
1. Clamp optical servo
2. Set $f_1 = f_b$
3. Sweep laser to find gas cell line
4. Turn on spurious mode reject
5. Unclamp optical servo
6. Step cavity mode to find strongest luminesence
7. Turn off spurious mode reject
8. Set fringe counter to closest integer to $$M\frac{f_g}{f_b}$$

Improvements in Accuracy

From equation 2.2.9, it is clear that the Allan variance of the CFS technique in inversely proportional the RF order number M, and the finesse of the optical cavity $\pi F$. The use of commercially available confocal cavities finesses greater than 200, and free spectral ranges in the hundreds of MHz, along with higher RF frequency $\omega_1/2\pi$ in the GHz range ($M \approx 20$) would provide a factor of 50 improvement over the 0.4 ppm frequency stability already demonstrated. Improvement in circuit design of the resonant modulator to lower the RF sideband imbalance, and improvement in the design of the sideband imbalance correction circuitry should improve the demonstrated locking to 25 ppm of a cavity fringe width to about 2 ppm of a fringe width. The improvements would result in an accuracy of one part per billion. This level of accuracy would require the measurement or calculation of the diffraction and dispersion corrections to $10^{-3}$, which is entirely feasible as shown below. The confocal cavity is straight forward to apply to the frequency synthesizer, but is difficul to apply to the frequency meter because its size can be changed only by a small amount, making the mode number determination difficult. Some other method of mode number determination would have to be applied to use a confocal cavity in an optical frequency meter.

For a two reflector confocal cavity used as a ring cavity, the diffraction correction in equation 3.1.6 has to be multiplied by 4 because there are four beam waists round trip in a confocal ring, instead of just one as previously assumed. Also, $$M\frac{f_m}{f_1} = 1,$$

whereby equation 3.1.6 would become $$f_0 = \left(N + 1 - \frac{1}{2\pi}(\Phi_m - f_0 \Phi'_m(f_0))\right)\frac{f_1}{M}. \quad (7.1.1)$$

The $2\pi$ diffraction phase shift can be set to an accuracy of a few percent of one out of the finesse by adjusting the reflector spacing until the mth transverse, and Nth longitudinal mode overlaps the m−1st transverse, and N+1st longitudinal mode. Therefore, the $10^{-3}$ accuracy for the diffraction correction can be achieved with a finesse of about 30 or greater.

If two frequency synthesizers A and B were built, a diffential calibration scheme could be accomplished by looking at the heterodyne frequency between the two as follows. Record the beat frequency, step synthesizer A, record beat frequency, step synthesizer B, record beat frequency, etc., over the entire tuning range of the synthesizers. Differences between successive beat frequencies from this "inch worm" like calibration provides the finite difference with respect to N of the dispersion correction for both the A synthesizer, and the B synthesizer. A summation of the finite differences provides the dispersion correction up to a constant. Taking the finite difference of equation 3.1.8 up to a given number of terms, and fitting it to the data enables determination of the constant. The constant can also be determined from relations derived from knowledge of the dielectric structure of the reflector[11]. Hence, the dispersion correction for the reflectors actually in use can be measured. Water vapor in the air is another source of dispersion which should show up at about the 0.01 ppm level. The optical cavity can be evacuated to remove this source of dispersion. An optical synthesizer with an absolute accuracy of 1 part per billion should be possible with commercially available optical cavities.

The accuracy could be extended to about the 0.001 parts per billion range, if a large (several meters) optical cavity with a mode number of $N \approx 10^7$, and a finesse of $\approx 3000$ were used. The derivative approximation used to derive equation 3.1.6 breaks down beyond this level of accuracy, which will invalidate the dispersion calibration. Also, this level of accuracy requires setting the diffraction phase shift to $2\pi$ within about 10 ppm. This constrains the reflector spacing in the optical cavity to a range of only tens of microns. Hence, extension of the accuracy beyond $10^{-12}$ would be very difficult.

Other Applications

Optical to RF frequency locking can be used to make an optical frequency standard out of an RF frequency standard. This is really just a special case of the optical frequency synthesizer, which has already been discussed. Use of a commercial optical cavity can give one part per billion accuracy in the frequency locking, which would be suitable for multiplying a quartz RF frequency standard up to optical frequency. Use of a large optical cavity with high finesse could give 0.001 part per billion accuracy, suitable for multiplying a Rubidium or Cesium frequency standard to the optical domain.

A third configuration that has not been mentioned yet is an instrument which can be used to calibrate accurately the free spectral range of a reference etalon. The servo loops are reconfigured so that the optical error signal is used to lock the laser to a cavity mode, and the RF error signal is used to lock the RF source to the optical cavity's free spectral range. A diagram of this instrument is shown in FIG. 7.2.1. The free spectral range can be determined from the RF frequency $f_1$ by the relation $$f_c = \frac{f_1}{M}, \quad (7.2.1)$$

ignoring dispersion.

A fourth instrument can be constructed to measure accurately the refractive index of a gas, and its first derivative with respect to frequency. The optical servo is designed to operate in one of two modes. In the first mode, the optical servo locks the laser to the optical cavity. In the second mode, the optical servo locks the optical cavity to the laser. In both modes, the RF servo locks the RF source to the optical cavity's free spectral range. The RF frequency $f_1$ is measured before gas is let into the optical cavity, then a new RF frequency $f_1'$ is measured after the gas is let into the optical cavity. In the first mode of operation, the cavity size stays constant, and the laser changes frequency to track the Nth cavity mode position as gas is let into the optical cavity. The RF frequency will track the change in the mode spacing of the cavity, giving a value proportional to the group velocity $$f_1' = (n(f_0) + f_0 n'(f_0))^{-1} f_1. \quad (7.2.2)$$

In the second mode of operation, the optical frequency stays constant, and the optical servo adjusts the cavity size to keep the Nth mode locked to the laser as the gas is let into the cavity. The RF frequency tracks the cavity mode spacing as the gas is let in, giving a value proportional to the ratio of phase velocity to group velocity $$f_1 = \left(1 + \frac{f_0 n'(f_0)}{n(f_0)}\right)^{-1} f_1. \quad (7.2.3)$$

The two types of measurements provide enough information to determine both the phase and group velocities, and hence the refractive index $n(f_0)$ and its first derivative $n'(f_0)$.

I claim:

1. A frequency locking circuit comprising:
   a source of a beam of continuous wave, coherent radiation of frequency $f_0$;
   means for phase modulating the beam, in response to a compound signal which is the sum of a signal at frequency $f_2$ and a FM subcarrier at frequency $f_1$ that is phase modulated at frequency $f_3$, to produce a phase modulated beam;
   a filter through which the phase modulated beam passes, said filter having a transfer function that has a characteristic frequency $f_f$;
   a detector responsive to the filtered beam to produce a detector signal;
   first means responsive to the component of the detector signal substantially at frequency $(Jf_1 + Kf_2 + Lf_3)$, where $(J + K)$ is an odd integer and L an even integer, for adjusting the ratio of $f_0/f_f$ to a fixed value N; and
   second means responsive to the component of the detector signal substantially at frequency $(Qf_1 + Rf_2 + Sf_3)$, where $(Q + R)$ is an even integer and S an odd integer, for adjusting the ratio of $f_1/f_f$ to a fixed value M.

2. The circuit of claim 1 wherein M and N are integers.

3. The circuit of claim 1 wherein J, L, Q, R, are each substantially equal to zero and K, S are non-zero, so that the detector and the two adjusting means are required to operate only at frequencies of the order of $f_2$, $f_3$.

4. The circuit of claim 1, wherein the transfer function of the filter exhibits a plurality of fundamental modes at frequency $Nf_f$, where N is an integer, as well as one or more sets of spurious modes of frequency other than $Nf_f$, said spurious modes having amplitudes less than that at the fundamental frequency $Nf_f$, said circuit further comprising means for comparing the intensity of the filtered beam to a threshold to provide an output, one of said two adjusting means responsive to said comparing means output to prevent said adjusting means from responding to the effects on the filtered beam by the spurious modes.

5. The circuit of claim 1, wherein said filter or said radiation frequency has a tuning range, wherein said first adjusting means comprises a servo feedback loop for deriving a radiation error signal for controlling the radiation frequency $f_0$ or the filter characteristic frequency $f_f$, said feedback loop comprising an integrator which is clamped to a voltage corresponding to the midrange of the tuning range during an initialization of the circuit.

6. The circuit of claim 5, wherein said servo loop further comprises a second integrator upstream from the first integrator in the servo loop, said second integrator being clamped to a voltage equal to a rail voltage of the circuit during an initialization of the circuit.

7. The circuit of claim 1, wherein said filter is a multimode filter with characteristic mode frequencies at $Nf_f$ and $(N \pm M) f_f$, wherein said first adjusting means adjusts and locks the filter mode characteristic frequency $Nf_f$ to radiation frequency $f_0$, and wherein said second adjusting means adjusts and locks the subcarrier frequency $f_1$ to M times the mode spacing of the filter, so that the radiation frequency $f_0$ is determined at least in part by measurement of the subcarrier frequency $f_1$.

8. The circuit of claim 1, wherein the filter is a multimode filter with characteristic mode frequencies at $Nf_f$ and $(N \pm M)f_f$, wherein said first adjusting means adjusts and locks the radiation frequency $f_0$ to the filter mode characteristic frequency $Nf_f$, and wherein said second adjusting means adjusts and locks an integral multiple of the filter mode spacing to the subcarrier frequency $f_1$ while the first adjusting means maintains the locking of the radiation frequency to the filter frequency, to synthesize a desired radiation frequency from the subcarrier frequency.

9. A frequency locking method comprising:
   supplying a beam of continuous wave, coherent radiation of frequency $f_0$;
   phase modulating the beam, in response to a compound signal which is the sum of a signal at frequency $f_2$ and a FM subcarrier at frequency $f_1$ that is phase modulated at frequency $f_3$, to produce a phase modulated beam;

filtering the phase modulated beam by means of a filter whose transfer function has a characteristic frequency $f_f$;

detecting the filtered beam to produce a detector signal;

adjusting the ratio of $f_0/f_f$ to a fixed value N in response to the component of the detector signal substantially at frequency $(Jf_1+Kf_2+Lf_3)$, where $(J+K)$ is an odd integer and L an even integer; and adjusting the ratio of $f_1/f_f$ to a fixed value M in response to the component of the detector signal substantially at frequency $(Qf_1+Rf_2+Sf_3)$, where $(Q+R)$ is an even integer and S an odd integer.

10. The method of claim 9, wherein the filter is a multimode filter whose transfer function has characteristic frequencies $Nf_f$ and $(N\pm M)f_f$, wherein said first adjusting step adjusts and locks the filter characteristic mode frequency $Nf_f$ to radiation frequency $f_0$, and wherein said second adjusting step adjusts and locks the subcarrier frequency $f_1$ to M times the mode spacing of the filter, said method further comprising measuring the subcarrier frequency.

11. The method of claim 10, said method further comprising:

unlocking the filter characteristic mode frequency $Nf_f$ from the radiation frequency;

adjusting the filter, locking a different mode N' of the filter to the radiation frequency and counting the change in mode number P during the adjustment;

adjusting and locking the subcarrier frequency to the different mode N' of the filter; and measuring the post-adjustment subcarrier frequency to determine the radiation frequency and new mode number from the change in mode number, the pre-adjustment and the post-adjustment subcarrier frequencies.

12. The method of claim 11, wherein the subcarrier frequency has uncertainty U and wherein the filter adjusting and locking step is such that the product of U and the ratio N/P is less than 1, so that the new mode number N' is accurately calculated by rounding off its calculated value to the nearest integer.

13. The method of claim 9, wherein the filter is a multimode filter whose transfer function has characteristic frequencies $Nf_f$ and $(N\pm M)f_f$, wherein said first adjusting step adjusts and locks the radiation frequency $f_0$ to the filter characteristic mode frequency $Nf_f$, and wherein said second adjusting step adjusts and locks an integral multiple of the filter mode spacing to the subcarrier frequency $f_1$ while maintaining the locking of the radiation frequency to the filter frequency, to synthesize a desired value of radiation frequency from the subcarrier frequency.

14. The method of claim 13, wherein said first adjusting step adjusts and locks the radiation frequency to a filter mode that yields a first approximation of the desired value of the radiation frequency, and wherein the second adjusting step adjusts and locks the filter mode spacing and hence also the radiation frequency, causing the radiation frequency to be adjusted accurately to the desired value.

15. A method for calibrating a multimode filter whose transfer function has characteristic frequencies $Nf_f$ and $(N\pm M)f_f$, said method comprising:

supplying a beam of continuous wave, coherent radiation of frequency $f_0$;

phase modulating the beam, in response to a compound signal which is the sum of a signal at frequency $f_2$ and a FM subcarrier at frequency $f_1$ that is phase modulated at frequency $f_3$, to produce a phase modulated beam;

supplying the phase modulated beam to the filter to filter the phase modulated beam according to the transfer function;

detecting the filtered beam to produce a detector signal;

adjusting the radiation frequency so as to set the ratio of $f_0/f_f$ to the fixed value N in response to the component of the detector signal substantially at frequency $(Jf_1+Kf_2+Lf_3)$, where $(J+K)$ is an odd integer and L an even integer; and adjusting the subcarrier frequency to lock it to the mode spacing of the filter so as to set the ratio of $f_1/f_f$ to a fixed value M in response to the component of the detector signal substantially at frequency $(Qf_1+Rf_2+Sf_3)$, where $(Q+R)$ is an even integer and S an odd integer, thereby determining the mode spacing of the filter.

16. A frequency locking device for measuring the refractive index of a gas, said device comprising:

a source of a beam of continuous wave, coherent radiation of frequency $f_0$;

means for phase modulating the beam, in response to a compound signal which is the sum of a signal at frequency $f_2$ and a FM subcarrier at frequency $f_1$ that is phase modulated at frequency $f_3$, to produce a phase modulated beam;

an optical cavity through which the phase modulated beam passes, said cavity having a transfer function that has a characteristic frequency $f_f$;

means for letting the gas into the optical cavity to change the transfer function as a function of the refractive index of the gas;

a detector responsive to the filtered beam to produce a detector signal;

first means responsive to the component of the detector signal substantially at frequency $(Jf_1+Kf_2+Lf_3)$, where $(J+K)$ is an odd integer and L an even integer, for adjusting the ratio of $f_0/f_f$ to a fixed value N;

second means responsive to the component of the detector signal substantially at frequency $(Qf_1+Rf_2+Sf_3)$, where $(Q+R)$ is an even integer and S an odd integer, for adjusting the ratio of $f_1/f_f$ to a fixed value M; and means for measuring the subcarrier frequency before and after gas is let into the optical cavity to determine the refractive index of the gas.

17. The device of claim 16, wherein said cavity has characteristic mode frequency $Nf_f$, wherein said first adjusting means adjusts and locks the filter mode characteristic frequency $Nf_f$ to radiation frequency $f_0$, and wherein said second adjusting means adjusts and locks the subcarrier frequency $f_1$ to the free spectral range of the cavity.

18. The circuit of claim 16, wherein said cavity has characteristic mode frequency $Nf_f$, wherein said first adjusting means adjusts and locks the radiation frequency $f_0$ to the filter mode characteristic frequency $Nf_f$, and wherein said second adjusting means adjusts and locks the subcarrier frequency $f_1$ to the free spectral range of the cavity.

19. A frequency locking method for measuring the refractive index of a gas, said method comprising:

supplying a beam of continuous wave, coherent radiation of frequency $f_0$;

phase modulating the beam, in response to a compound signal which is the sum of a signal at frequency $f_2$ and a FM subcarrier at frequency $f_1$ that is phase modulated at frequency $f_3$, to produce a phase modulated beam;

passing the phase modulated beam through an optical cavity, said cavity having a transfer function that has a characteristic frequency $f_f$;

detecting the filtered beam to produce a detector signal;

adjusting the ratio of $f_0/f_f$ to a fixed value N in response to the component of the detector signal substantially at frequency $(Jf_1 + Kf_2 + Lf_3)$, where $(J+K)$ is an odd integer and L an even integer; and adjusting the ratio of $f_1/f_f$ to a fixed value M in response to the component of the detector signal substantially at frequency $(Qf_1 + Rf_2 + Sf_3)$, where $(Q+R)$ is an even integer and S and odd integer;

measuring the subcarrier frequency;

letting the gas into the optical cavity to change the transfer function as a function of the refractive index of the gas;

adjusting the ratio of $f_0/f_f$ to a fixed value N in response to the component of the detector signal substantially at frequency $(Jf_1 + Kf_2 + Lf_3)$, where $(J+K)$ is an odd integer and L an even integer; and adjusting the ratio of $f_1/f_f$ to a fixed value M in response to the component of the detector signal substantially at frequency $(Qf_1 + Rf_2 + Sf_3)$, where $(Q+R)$ is an even integer and S an odd integer;

measuring the subcarrier frequency to determine the refractive index of the gas.

* * * * *